Oct. 11, 1966 H. I. TILLINGER 3,278,829
FREQUENCY GENERATORS WITH SELECTED SECONDARY FREQUENCIES SUPERIMPOSED ON MAIN OUTPUT
Filed March 28, 1962
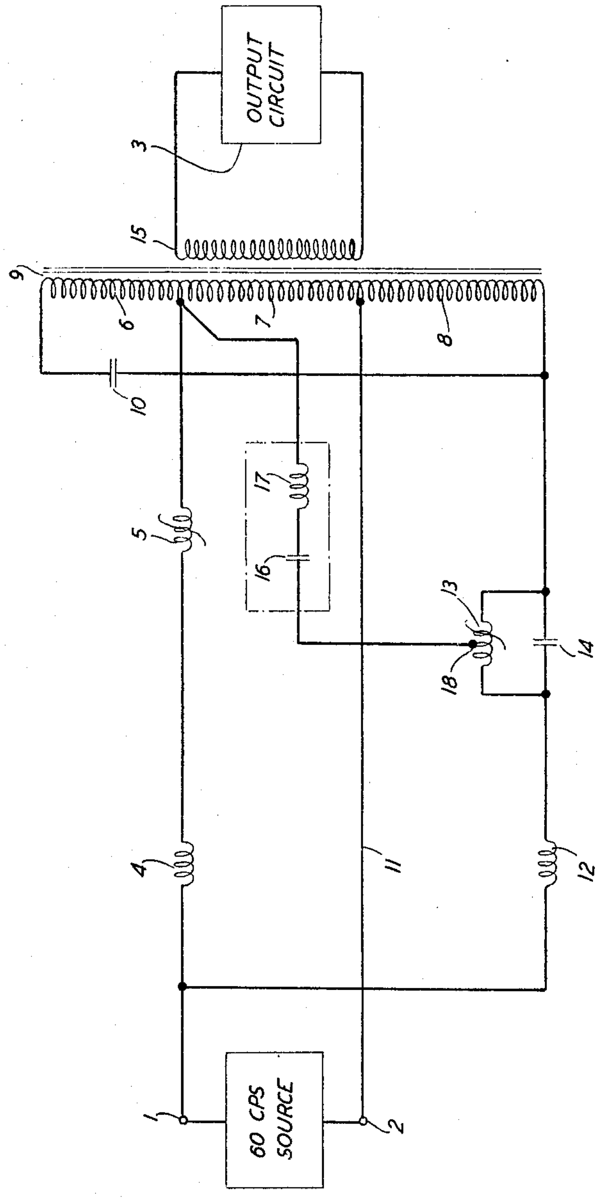
INVENTOR
H. I. TILLINGER
BY E. J. Olivider
ATTORNEY

United States Patent Office 3,278,829
Patented Oct. 11, 1966

3,278,829

FREQUENCY GENERATORS WITH SELECTED SECONDARY FREQUENCIES SUPERIMPOSED ON MAIN OUTPUT

Herman I. Tillinger, Morris Township, Morris County, N.J., assignor to Bell Telephone Laboratories, Incorporated, New York, N.Y., a corporation of New York Filed Mar. 28, 1962, Ser. No. 183,273
2 Claims. (Cl. 321—69)

This invention relates to modulators, and more particularly to arrangements for superimposing upon each other signals of different frequency.

In telephone signaling it is now common practice to apply to the receiver of a calling party's subset during ringing an audible signal known as ringback tone which informs the calling party that his connection to the called party has been completed. Two distinct waves are usually required for this type of signaling, one a relatively low frequency signal, say 20 c.p.s., which activates the clapper arm of the called party's ringer, and the other a relatively high frequency signal, say 460 c.p.s., which serves as ringback tone for the calling party. In the past it has been found most advantageous to generate the 20-cycle signal with what is commonly known as a Fallou circuit such as disclosed by U.S. Patent 1,633,481 granted to J. G. Fallou on June 27, 1927, and more recently, with the self-starting improved circuit of the Fallou type described in copending application Serial No. 153,469, now Patent No. 3,235,785, filed November 20, 1961, by B. E. Stevens. To the 20-cycle signal generated as aforesaid, ringback tone may conveniently be added by means of a periodically shock excited 460 c.p.s. tuned circuit and a transformer combined as described in U.S. Patent 2,870,332 granted to J. K. Mills on January 29, 1959. While ringing and ringback signal generating arrangements such as those described above have generally been found satisfactory from the standpoint of performance, factors such as the bulk, quantity, expense and complexity of components required by such systems have rendered them far short of ideal.

Accordingly, the principal object of this invention is to generate signals, suitable for the type of signaling described above, by means of circuit arrangements which while being smaller, less complex and hence more economical than systems previously used, exhibit undiminished accuracy and reliability.

The objects of the invention are accomplished, broadly, by adding to a signal source, which delivers a primary signal to an output circuit and also internally generates at least one other signal, a frequency selective circuit disposed in such manner that the internally generated signal is introduced to the output circuit in superimposed relation with the primary signal.

The principal feature of the invention resides in the combination of a series resonant circuit with a shunt resonant circuit which is interconnected in such manner that signals circulating in the shunt circuit, having a frequency substantially equal to the frequency at which the series circuit is resonant, are, figuratively speaking, allowed to escape from the shunt circuit and be applied elsewhere through the series circuit for useful purposes. In one illustrative embodiment of the invention, to be described in greater detail below, the shunt resonant circuit comprises a capacitor and a nonlinear inductor, the series resonant circuit comprises a capacitor and a linear inductor, and the series circuit is bridged between a tap on the nonlinear inductor and an output circuit in such manner that the series circuit, the output circuit and a portion of the nonlinear inductor form a closed loop.

The foregoing and other objects and features of the invention will be more thoroughly understood by reference to the following detailed description of an illustrative embodiment of the invention in conjunction with the drawing which, for purposes of illustration only, shows the invention embodied in a frequency changer, similar to the one disclosed by the aforementioned Stevens' application, but modified in accordance with the present invention to provide means for superimposing a high frequency signal on the normally low frequency output signal.

With reference to the drawing, the circuit shown, excluding the portion enclosed by dashed lines, is a self-starting frequency changer which converts a 60-cycle sinusoidal signal applied to input terminals 1 and 2 to a 20-cycle sinusoidal signal at output circuit 3. As shown, the frequency changer comprises a first network including linear inductor 4, nonlinear inductor 5, primary windings 6 and 8 of transformer 9, tuning capacitor 10, and common return lead 11, all connected in series across input terminals 1 and 2. A second series network comprising linear inductor 12, shunt combined nonlinear inductor 13 and second tuning capacitor 14, tuning capacitor 10, windings 6 and 7 of transformer 9, and common return lead 11, is also connected in series across input terminals 1 and 2. Signals generated by the frequency changer are applied to output circuit 3 via the secondary winding 15 of transformer 9.

In the embodiment of the invention described herein, the impedance values of the various elements are so related that when nonlinear inductors 5 and 13 are driven into their saturated states, the first and second series networks are resonant at 20 c.p.s., and the mesh comprising nonlinear inductor 13 and capacitor 14 is resonant at a frequency of 100 c.p.s. Furthermore, to compensate for the difference in output voltage between the first and second series networks when their nonlinear inductors are driven into saturation, that is to say the voltage appearing across windings 7 and 8, the turns ratio of these windings is adjusted such that the voltage per turn of each winding is the same. In one illustrative circuit configuration, found by experiment to meet the requirements set forth above, capacitors 10, 14 and 16, respectively, have reactance values of 14 μf., 14 μf. and 0.66 μf., inductors 12 and 17, respectively, have reactance values of 0.12 henry and 0.2 henry, nonlinear inductor 13, which is a saturable reactor, has reactances of 0.6 henry at 0.5 ampere, 0.3 henry at 1.0 ampere and 0.2 henry at 2.0 amperes, and the series combination of linear inductor 4 and nonlinear inductor 5 has reactances of 16 henries at 0.01 ampere, 4 henries at 0.1 ampere and 2.7 henries at 0.2 ampere.

In normal operation, when the 60 c.p.s. input signal is of sufficient magnitude to drive inductor 13 into saturation, 20 c.p.s. and 100 c.p.s. signals are induced in the meshes of the second series network which are respectively tuned to those frequencies. As is fully explained in an article entitled "Static Frequency-Generators for Ringing Power" by W. F. Kannenberg, published in the July 1961 issue of the Bell Laboratories Record at page 255, the 60 c.p.s. signal interacts with the 20 c.p.s. and 100 c.p.s. signals in such manner as to induce alternately phased current surges in inductor 13 at a 20 pulse per second rate. The surges initiate a 20-cycle signal in the first of the above-mentioned series networks, that is, the loop comprising inductor 4 and windings 6 and 8 of transformer 9. Consequently, a strong 20-cycle signal is coupled to output circuit 3 via secondary winding 15, which may thereafter be utilized to activate the ringer unit of a subscriber telephone set.

It is a well-known phenomenon that when a nonlinear element, such as inductor 13, is excited with a signal of some primary frequency, a series of waves will be generated by that element comprising odd harmonics of the excitation signal. Consequently, by virtue of both the predominant 20 c.p.s. signal propagating through the entire network and the 20 pulse per second surges of current, there is induced and circulated in the mesh comprising nonlinear inductor 13 and capacitor 14 a series of waves comprising odd harmonics of 20 c.p.s.

According to the invention, a frequency selective path is connected to the above-described frequency changer in such manner that a predetermined one of the aforementioned odd harmonics is permitted, figuratively speaking, to escape from the mesh in which it is circulating and be applied to the secondary windings of transformer 9 in superimposed relation with the 20 c.p.s. output signal. In the embodiment of the invention pictured in the drawing, the frequency selective path comprises a capacitor 16 and a linear inductor 17, in series with each other and tuned to a particular odd harmonic desired to be superimposed, bridged between a tap 18 on nonlinear inductor 13 and the junction of windings 6 and 7 of transformer 9. Although the tap 18 is illustrated in the drawing as being a fixed connector, it will become apparent as the description proceeds that a variable or slide wire connector may conveniently be employed to regulate the magnitude of signals which flow through the frequency selective path.

When the frequency changer is operating as previously described, nonlinear inductor 13 serves as the active element of the mesh including capacitor 16, inductor 17 and windings 7 and 8 of transformer 9. Since a series resonant circuit normally presents a very low impedance to the frequency to which it is tuned, the particular frequency to which capacitor 16 and inductor 17 are tuned, one of the circulating odd harmonics here, is channeled through this low impedance path and impressed on transformer 9 in superimposed relation with the 20 c.p.s. output signal. At output circuit 3, the higher frequency, that is the odd harmonic, may be conveniently separated from the lower frequency, the 20 c.p.s. signal, by conventional filtering means so that the two signals may be utilized simultaneously but at separate locations. For example, if the circuit just described is incorporated into a telephone signaling system, the 20-cycle signal may be utilized to energize the ringer of a called subscriber's subset, while the odd harmonic, preferably 460 c.p.s., may serve as audible ringback tone to notify a calling subscriber that his connection has been completed.

Although only a single embodiment of the invention has been described herein, it should be apparent to anyone skilled in the art that numerous other embodiments and arrangements may be conceived without departing from either the spirit or scope of the invention.

What is claimed is:

1. Apparatus generating superimposed signals comprising first and second circuit meshes; said first mesh including a tapped nonlinear inductance element and a first tuning capacitor; means for connecting said inductance element and said first tuning capacitor in shunt with each other; and said second mesh including a source of alternating current signals, a linear inductance element, said tapped nonlinear inductance element and a second tuning capacitor all connected in series with each other in a closed circuit loop; a frequency selective circuit; means for bridging said frequency selective circuit between the tap of said tapped nonlinear inductance element and said second tuning capacitor such that a closed circuit loop is formed comprising said frequency selective circuit, said tuning capacitor and a tapped portion of said nonlinear inductance element, whereby signals of the selected frequency which are resonating in said first mesh are applied to said second tuning capacitor by said frequency selective circuit.

2. Apparatus in accordance with claim 1 wherein said frequency selective circuit comprises an inductor element and a capacitor element connected in series with each other, said inductor and capacitor having relative reactance values such that the series combination of said elements is resonant at a harmonic of said first circuit mesh.

References Cited by the Examiner

UNITED STATES PATENTS

| | | | |
|---|---|---|---|
| 1,632,626 | 6/1927 | Schmidt | 321—69 |
| 2,088,619 | 8/1937 | Stocker | 321—69 |
| 2,234,213 | 3/1941 | Wrathall | 321—69 |
| 2,278,669 | 4/1942 | Pohm | 321—69 |
| 2,313,440 | 3/1943 | Huge | 323—76 |
| 2,600,560 | 6/1952 | McMahon | 321—69 |

JOHN F. COUCH, *Primary Examiner.*

LLOYD McCOLLUM, *Examiner.*

G. J. BUDOCK, G. GOLDBERG, *Assistant Examiners.*